US012596252B2

(12) United States Patent (10) Patent No.: US 12,596,252 B2

Chen et al. (45) Date of Patent: Apr. 7, 2026

(54) DISPLAY WINDOW AND VEHICLE

(71) Applicant: FUYAO GLASS INDUSTRY GROUP CO., LTD., Fuqing (CN)

(72) Inventors: Zhixin Chen, Fuqing (CN); Peng Ren, Fuqing (CN); Yuemin Lu, Fuqing (CN); Changlong He, Fuqing (CN); Jinliang Guan, Fuqing (CN); Bingming Jiang, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 289 days.

(21) Appl. No.: 18/585,718

(22) Filed: Feb. 23, 2024

(65) Prior Publication Data

US 2024/0192491 A1 Jun. 13, 2024

Related U.S. Application Data

(63) Continuation of application No. PCT/CN2022/119400, filed on Sep. 16, 2022.

(30) Foreign Application Priority Data

Sep. 18, 2021 (CN) .......................... 202111102031.4

(51) Int. Cl.
*G02B 5/30* (2006.01)
*B32B 17/06* (2006.01)
(Continued)

(52) U.S. Cl.
CPC .......... *G02B 27/0101* (2013.01); *B32B 17/06* (2013.01); *B60J 1/02* (2013.01);
(Continued)

(58) Field of Classification Search
CPC ...... G02B 27/0101; G02B 1/10; G02B 27/18; G02B 27/28; G02B 2027/0194;
(Continued)

(56) References Cited

U.S. PATENT DOCUMENTS

| 2004/0105150 A1* | 6/2004 | Yatsu | ................... | G02B 27/283 |
| | | | | 359/489.08 |
| 2010/0039707 A1* | 2/2010 | Akahane | .............. | G02B 3/0087 |
| | | | | 359/321 |

(Continued)

FOREIGN PATENT DOCUMENTS

| CN | 105785570 A | 7/2016 |
| CN | 106094213 A | 11/2016 |

(Continued)

OTHER PUBLICATIONS

International Search Report dated Nov. 29, 2022 issued in PCT/CN2022/119400.

(Continued)

*Primary Examiner* — Howard D Brown, Jr.

(74) *Attorney, Agent, or Firm* — Scully, Scott, Murphy & Presser, P.C.

(57) ABSTRACT

A display window and a vehicle are provided. The display window includes window glass and at least one projection device. The at least one projection device is configured to generate at least one beam of projection light, and correspondingly project the at least one beam of projection light onto at least one projection region of the window glass to correspondingly form at least one projection image. At least 90% of each of the at least one beam of projection light is S-polarized light. The at least one beam of projection light includes first projection light. The at least one projection region includes a first projection region. The first projection region has a first reflectivity of at least 25% for the first projection light projected at the first angle of incidence.

20 Claims, 7 Drawing Sheets

(51) Int. Cl.

| | |
|---|---|
| *B60J 1/02* | (2006.01) |
| *B60R 11/02* | (2006.01) |
| *G02B 1/10* | (2015.01) |
| *G02B 27/01* | (2006.01) |
| *G02B 27/18* | (2006.01) |
| *G02B 27/28* | (2006.01) |
| *H04N 5/74* | (2006.01) |

(52) U.S. Cl.
CPC ............... *G02B 1/10* (2013.01); *G02B 27/18* (2013.01); *G02B 27/28* (2013.01)

(58) Field of Classification Search
CPC . G02B 27/286; B32B 17/06; B32B 17/10183; B32B 17/10201; B32B 2255/20; B32B 2255/28; B32B 2307/204; B32B 2307/7376; B32B 1/00; B32B 3/263; B32B 17/10348; B32B 2307/41; B32B 2307/412; B32B 7/12; B32B 2307/416; B32B 2307/418; B32B 2457/20; B32B 2605/08; B32B 17/10036; B32B 17/10568; B60J 1/02; B60J 1/00; C03C 17/3417; C03C 2217/734; B60K 2360/334; B60K 35/00; B60K 35/23; B60R 1/00; B60R 2300/205; B60R 1/001
See application file for complete search history.

(56) References Cited

U.S. PATENT DOCUMENTS

| | | | |
|---|---|---|---|
| 2012/0057134 A1* | 3/2012 | Huang | ............... G03B 21/2073 |
| | | | 359/485.05 |
| 2016/0178901 A1 | 6/2016 | Ishikawa | |
| 2017/0013188 A1* | 1/2017 | Kothari | ............... B60R 11/0235 |
| 2017/0269363 A1 | 9/2017 | Fujita et al. | |
| 2020/0018976 A1 | 1/2020 | Van Wiemeersch et al. | |
| 2020/0238824 A1 | 7/2020 | Park | |
| 2020/0333593 A1* | 10/2020 | Bard | ........................ G02B 1/11 |
| 2023/0375830 A1* | 11/2023 | Tso | ................... B32B 17/10761 |

FOREIGN PATENT DOCUMENTS

| | | | | | |
|---|---|---|---|---|---|
| CN | 109799615 | A | | 5/2019 | |
| CN | 110650844 | A | | 1/2020 | |
| CN | 111094048 | A | * | 5/2020 | ............. B60R 11/02 |
| CN | 112969952 | A | | 6/2021 | |
| CN | 113071165 | A | | 7/2021 | |
| CN | 113109939 | A | | 7/2021 | |
| DE | 102019118595 | A1 | | 1/2020 | |
| EP | 3432050 | A1 | | 1/2019 | |
| FR | 2985578 | A1 | | 7/2013 | |
| JP | S61-119833 | A | | 6/1986 | |
| JP | S61119833 | U | | 7/1986 | |
| JP | H02141720 | A | | 5/1990 | |
| JP | H02254882 | A | | 10/1990 | |
| JP | 2002173347 | A | | 6/2002 | |
| JP | 2021507868 | A | | 2/2021 | |
| JP | 2021085990 | A | | 6/2021 | |
| WO | 2016103418 | A1 | | 6/2016 | |
| WO | 2016150713 | A1 | | 9/2016 | |
| WO | 2019179683 | A1 | | 9/2019 | |
| WO | 2020083649 | A1 | | 4/2020 | |
| WO | 2020166286 | A1 | | 8/2020 | |
| WO | 2021/054222 | A1 | | 3/2021 | |
| WO | 2021145387 | A1 | | 7/2021 | |

OTHER PUBLICATIONS

Chinese First Office Action dated Jun. 1, 2022 issued in CN 202111102031.4.

Notice of allowance dated Jan. 4, 2023 issued in CN 202111102031.4.

Request for the Submission of an Opinion dated Jun. 13, 2025 received in Korean Application No. 10-2024-7006228.

Decision to Grant a Patent dated May 1, 2025 received in Japanese Application No. 2024-513127.

Extended European search report dated Dec. 16, 2024 received in European Patent Application No. 22869426.1.

Notice of Reasons for Refusal dated Jan. 6, 2025 received in Japanese Patent Application No. 2024-513127.

* cited by examiner

1000

1000

DISPLAY WINDOW AND VEHICLE

CROSS-REFERENCE TO RELATED APPLICATIONS

This application is a continuation of International Application No. PCT/CN2022/119400, filed Sep. 16, 2022, which claims priority to Chinese Patent Application No. 202111102031.4, filed Sep. 18, 2021, the entire disclosures of each of which are incorporated herein by reference.

TECHNICAL FIELD

This disclosure relates to the field of vehicle technology, and in particular, to a display window and a vehicle.

BACKGROUND

Existing window glass of vehicles is limited in function, is only used for windshield, and cannot meet the usage requirements of users.

SUMMARY

A display window is provided in the present disclosure. The display window includes window glass and at least one projection device. The at least one projection device is configured to generate at least one beam of projection light, and correspondingly project the at least one beam of projection light onto at least one projection region of the window glass to correspondingly form at least one projection image. At least 90% of each of the at least one beam of projection light is S-polarized light. The at least one beam of projection light includes first projection light. The at least one projection region includes a first projection region. The first projection light is projected onto the first projection region at a first angle of incidence to form a first projection image. The first projection region has a first reflectivity of at least 25% for the first projection light projected at the first angle of incidence.

A vehicle is provided in the present disclosure. The vehicle includes a vehicle body and a display window. The display window includes window glass and at least one projection device. The at least one projection device is configured to generate at least one beam of projection light, and correspondingly project the at least one beam of projection light onto at least one projection region of the window glass to correspondingly form at least one projection image. At least 90% of each of the at least one beam of projection light is S-polarized light. The at least one beam of projection light includes first projection light. The at least one projection region includes a first projection region. The first projection light is projected onto the first projection region at a first angle of incidence to form a first projection image. The first projection region has a first reflectivity of at least 25% for the first projection light projected at the first angle of incidence. The window glass is mounted on the vehicle body. The projection device is disposed in the vehicle body.

BRIEF DESCRIPTION OF THE DRAWINGS

To describe technical solutions in embodiments of the present disclosure or in the related art more clearly, the following will give a brief introduction to accompanying drawings required for describing the embodiments or the related art. Apparently, the accompanying drawings hereinafter described merely illustrate some embodiments of the present disclosure. Based on the accompanying drawings, those of ordinary skill in the art can also obtain other accompanying drawings without creative effort.

DETAILED DESCRIPTION

The technical solutions in embodiments of the present disclosure are clearly and completely described hereinafter with reference to accompanying drawings in the embodiments of the present disclosure. Apparently, the described embodiments are merely part of rather than all of the embodiments of the present disclosure. All other embodiments obtained by those of ordinary skill in the art based on the embodiments provided herein without creative efforts shall fall within the scope of the present disclosure.

Figure 6:
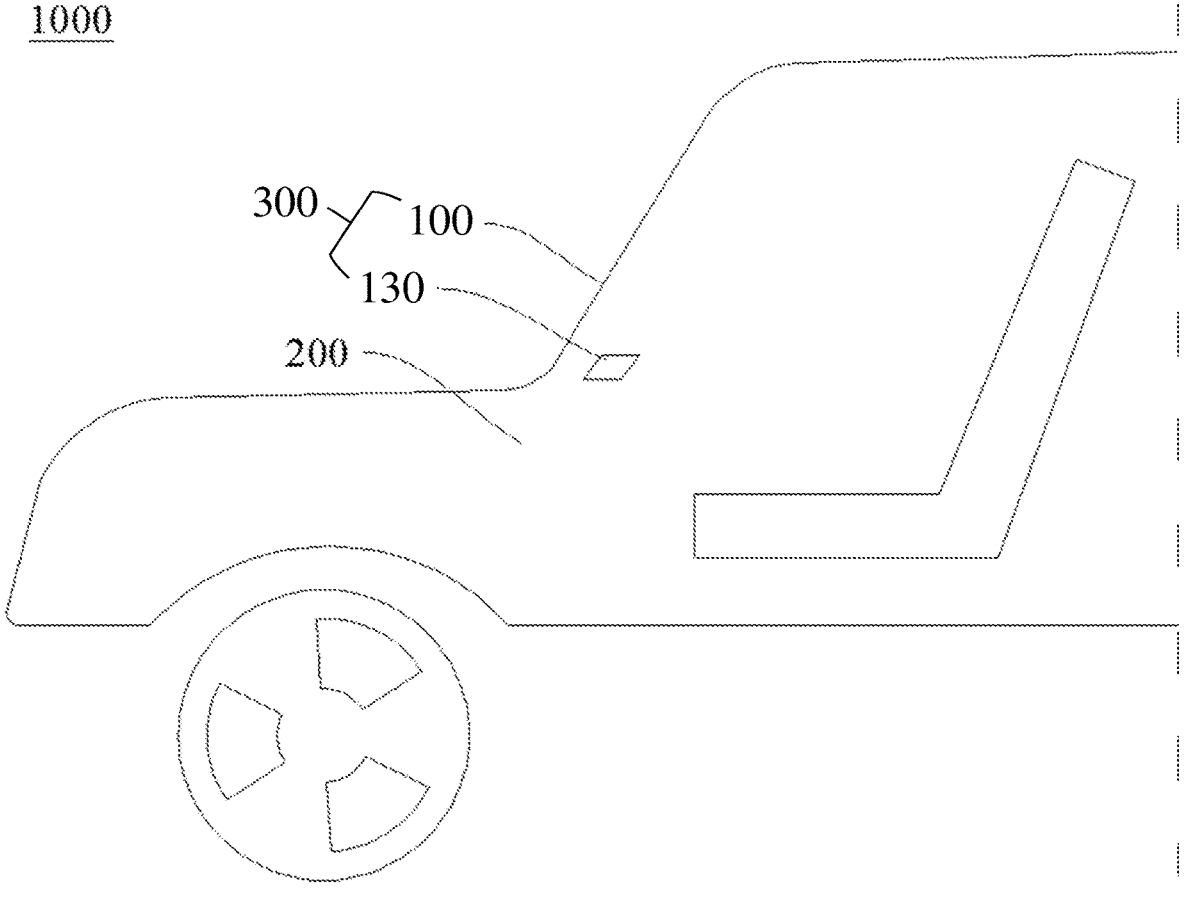
FIG. 6 is a schematic structural side view of a vehicle provided in embodiments of the present disclosure.

Referring to FIG. 6, a vehicle 1000 is provided in the present disclosure. The vehicle 1000 includes a vehicle body 200 and a display window 300. Window glass 100 is mounted on the vehicle body 200. A projection device 130 is disposed in the vehicle body 200. The display window 300 will be described as follows.

Figure 1:
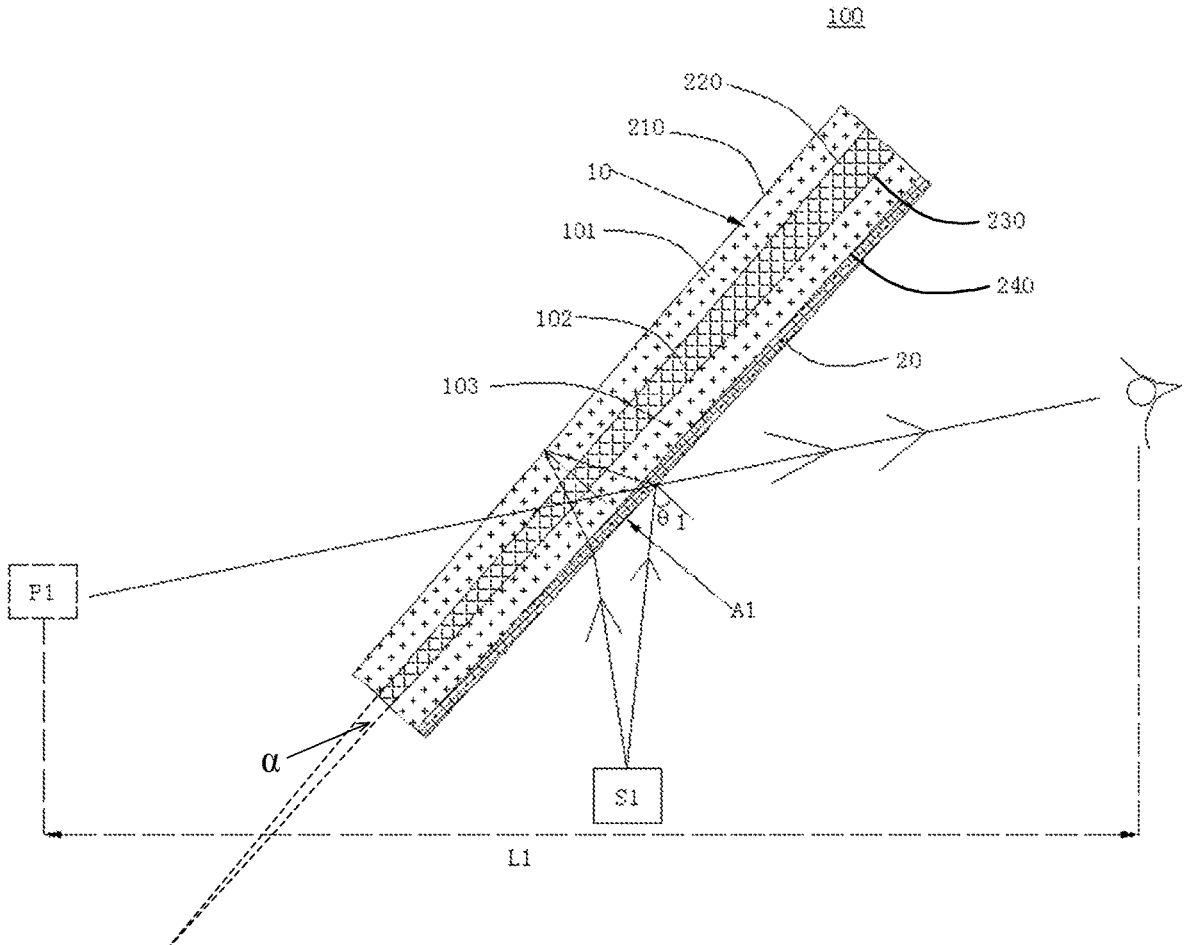
FIG. 1 is a schematic cross-sectional structural view of first projection light being incident on window glass provided in embodiments of the present disclosure.

Referring to FIG. 1 and FIG. 6, a display window 300 includes window glass 100 and at least one projection device 130. The at least one projection device 130 is configured to generate at least one beam of projection light, and correspondingly project the at least one beam of projection light onto at least one projection region of the window glass 100 to correspondingly form at least one projection image. At least 90% of each of the at least one beam of projection light is S-polarized light.

The at least one beam of projection light includes first projection light S1. The at least one projection region includes a first projection region A1. The first projection light S1 is projected onto the first projection region A1 at a first angle of incidence $\theta 1$ to form a first projection image P1. The first projection region A1 has a first reflectivity of at least 25% for the first projection light S1 projected at the first angle of incidence $\theta 1$. It is understood that at least one projection device 130 can generate one beam of projection light or can generate multiple beams of projection light. The first angle of incidence $\theta 1$ refers to an angle between the first projection light S1 and a normal of the first projection region A1 passing through a center point of the first projection region A1. The first reflectivity may be at least 30%, at least 35%, at least 40%, at least 50%, etc. A specific value of the first reflectivity is not specifically limited in the present disclosure.

In the present disclosure, the first projection region A1 has the first reflectivity of at least 25% for the first projection light S1 projected at the first angle of incidence $\theta 1$, so that the reflectivity for the first projection light S1 is increased, the brightness of the first projection image P1 is increased, the quality of the first projection image P1 is improved, and the luminous intensity of the projection device 130 does not need to be increased. Therefore, the technical problems, for example, in an existing display window, the brightness of the first projection image P1 cannot be greatly increased when the luminous power of the projection device 130 is not improved, and usage scenarios of the display window are limited, are solved. The improvement of the luminous intensity of the projection device 130 is avoided. Therefore, no more power and volume are needed for components such as a heat dissipation system and a light source system of the projection device 130, the difficulty of space design of the projection device 130 is reduced, and the risk of product failure and causing accidents is even reduced.

In addition, in the present disclosure, the window glass 100 can form the at least one projection image, so that the window glass 100 has multiple functions. The window glass 100 not only has a function of windshield, but also can display the at least one projection image, thereby improving the use value of the window glass 100.

Figure 7:
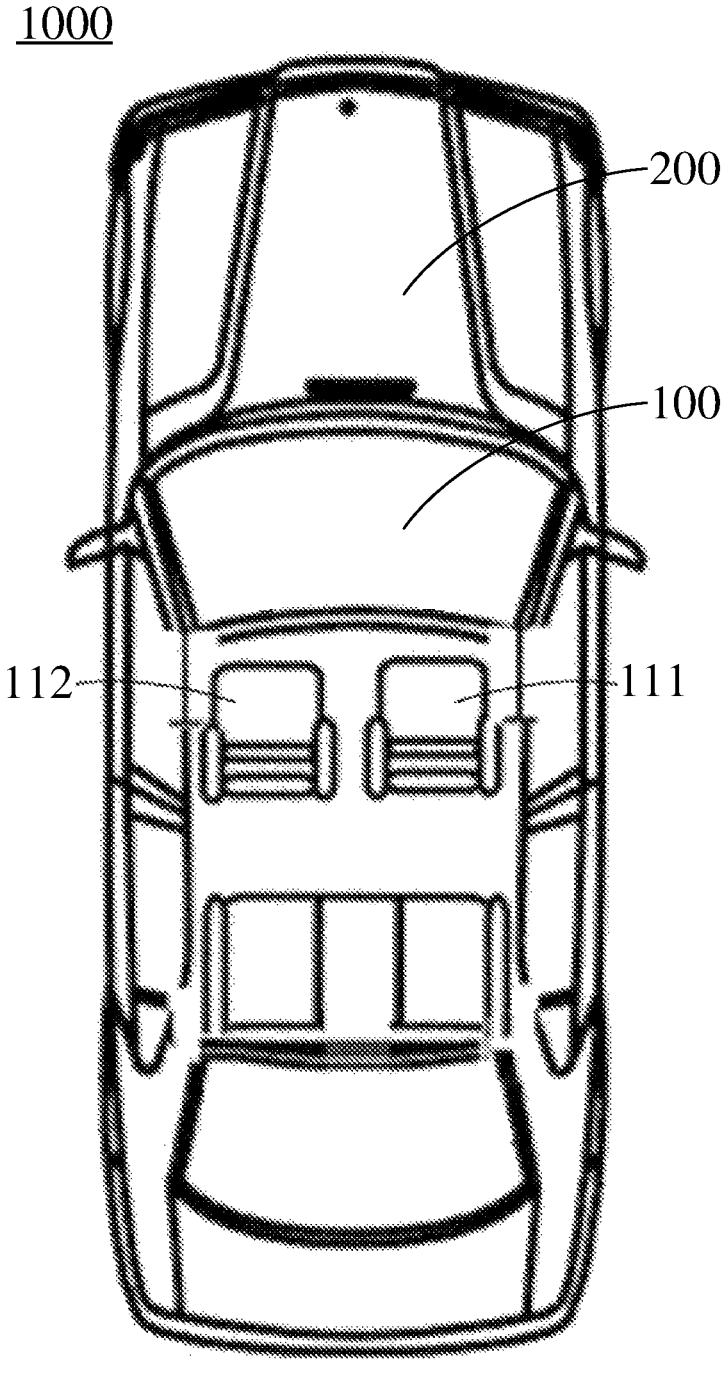
FIG. 7 is a schematic structural top view of a vehicle provided in embodiments of the present disclosure.

In an embodiment, the first projection region A1 corresponds to a front-seat passenger's viewing region of a vehicle 1000. In the present disclosure, the brightness of the first projection image P1 of the front-seat passenger's viewing region is increased, and the quality of the first projection image P1 of the front-seat passenger's viewing region is improved. There is no need to increase the luminous intensity of the projection device 130, nor to employ components such as the light source system with a larger volume. Referring to FIG. 7, the vehicle 1000 has a front passenger seat 111 and a driver's seat 112, a driver can sit in the driver's seat 112, a front-seat passenger can sit in the front passenger seat 111.

In an embodiment, the first angle of incidence θ1 ranges from 53° to 67°. A projection distance of the first projection image P1 ranges from 0.5 m to 3 m. At the above projection distance of the first projection image P1, a viewer can clearly see the first projection image P1. A specific value of the first angle of incidence θ1 is related to a specific position of the first projection image P1.

In an embodiment, the first projection image P1 has a horizontal field of view (FOV) ranging from 6° to 15°, and a vertical FOV ranging from 2° to 10°. Due to the above horizontal FOV of the first projection image P1 and the above vertical FOV of the first projection image P1, the first projection image P1 can be displayed in a relatively large range, and has high sharpness.

Figure 2:
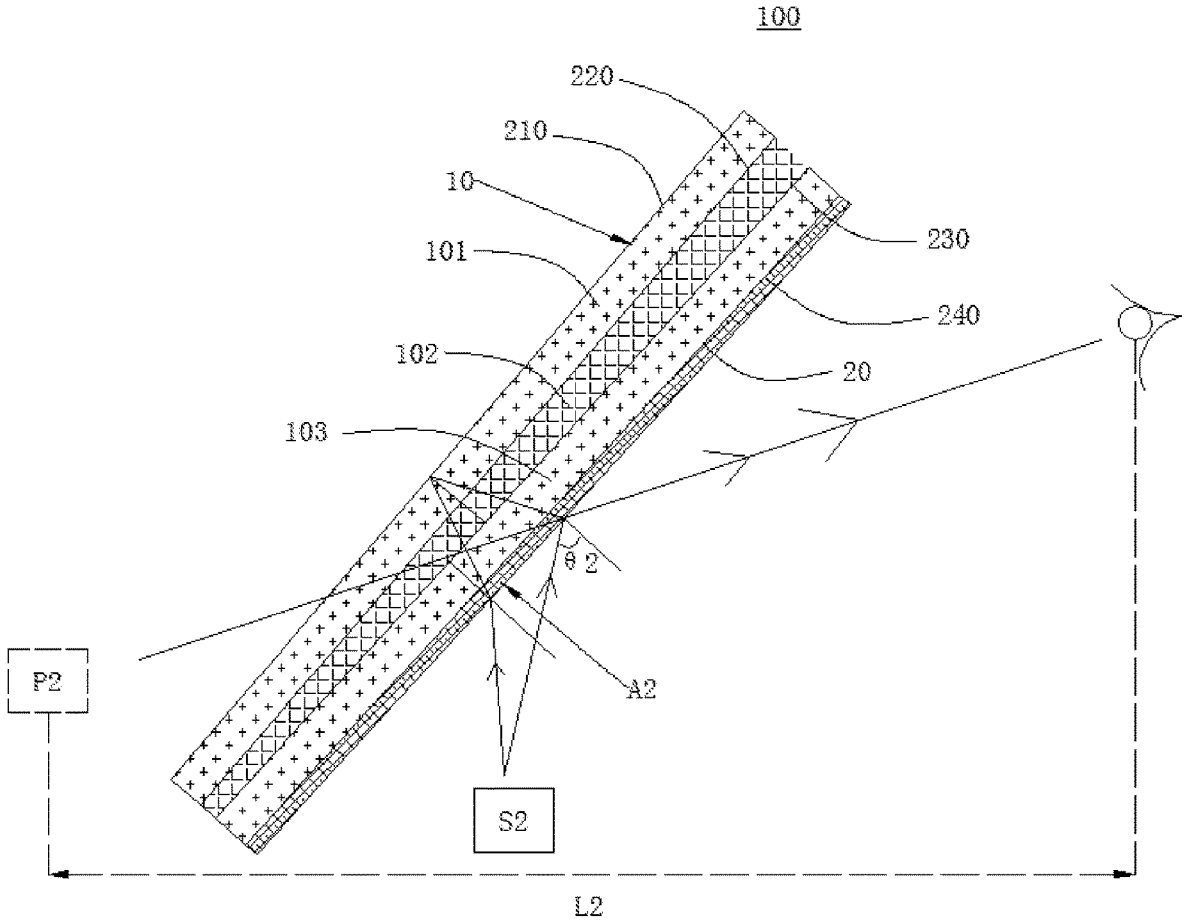
FIG. 2 is a schematic cross-sectional structural view of second projection light being incident on window glass provided in embodiments of the present disclosure.

Referring to FIG. 2, in an embodiment, at least one beam of projection light includes second projection light S2. The at least one projection region includes a second projection region A2. The second projection light S2 is projected onto the second projection region A2 at a second angle of incidence θ2 to form a second projection image P2. The second projection region A2 has a second reflectivity of at least 12% for the second projection light S2 projected at the second angle of incidence θ2. The first projection region A1 is spaced apart from the second projection region A2. It can be understood that the second angle of incidence θ2 refers to an angle between the second projection light S2 and a normal of the second projection region A2 passing through a center point of the second projection region A2. The second reflectivity may be at least 20%, at least 30%, at least 35%, at least 40%, at least 50%, etc. A specific value of the second reflectivity is not specifically limited in the present disclosure.

In the present disclosure, the second projection region A2 has the second reflectivity of at least 12% for the second projection light S2 projected at the second angle of incidence θ2, so that the reflectivity for the second projection light S2 is increased, the brightness of the second projection image P2 is increased, the quality of the second projection image P2 is improved, and the luminous intensity of the projection device 130 does not need to be increased.

In other words, in the present disclosure, by projecting the first projection light S1 onto the first projection region A1 of the window glass 100, the first projection image P1 can be formed on the first projection region A1. By projecting the second projection light S2 onto the second projection region A2 of the window glass 100, the second projection image P2 can be formed on the second projection region A2. Therefore, the window glass 100 can display two projection images, and the use value of the window glass 100 can be improved. In addition, the first projection image P1 is spaced apart from the second projection image P2, so that the first projection image P1 and the second projection image P2 do not interfere with each other, and the first projection image P1 and the second projection image P2 are displayed individually, thereby improving sharpness of the first projection image P1 and sharpness of the second projection image P2.

Referring to FIG. 7, in an embodiment, the second projection region A2 corresponds to a driver's viewing region 112 of the vehicle 1000. In the present disclosure, the brightness of the second projection image P2 of the driver's viewing region 112 is increased, and the quality of the second projection image P2 of the driver's viewing region 112 is improved. There is no need to increase the luminous intensity of the projection device 130, nor to employ components such as the light source system with the larger volume.

It can be understood that the first projection region A1 corresponds to the front-seat passenger's viewing region, and mainly displays entertainment image information such as videos, games, etc. The second projection region A2 corresponds to a windshield head up display (W-HUD) and an augmented reality head up display (AR-HUD) of the driver's viewing region 112, and mainly displays driving information of the vehicle 1000. The driving information includes instrument information, navigation information, some advanced driver assistance system (ADAS) information, etc.

In other words, in the present disclosure, the window glass 100 cannot only display the entertainment image information in the front-seat passenger's viewing region, but also display the driving information of the vehicle 1000 in the driver's viewing region. That is, in the present disclosure, the entertainment image information displayed in the front-seat passenger's viewing region and the driving information displayed in the driver's viewing region can be displayed simultaneously, or one of the entertainment image information displayed in the front-seat passenger's viewing region and the driving information displayed in the driver's viewing region can be displayed.

Figure 3:
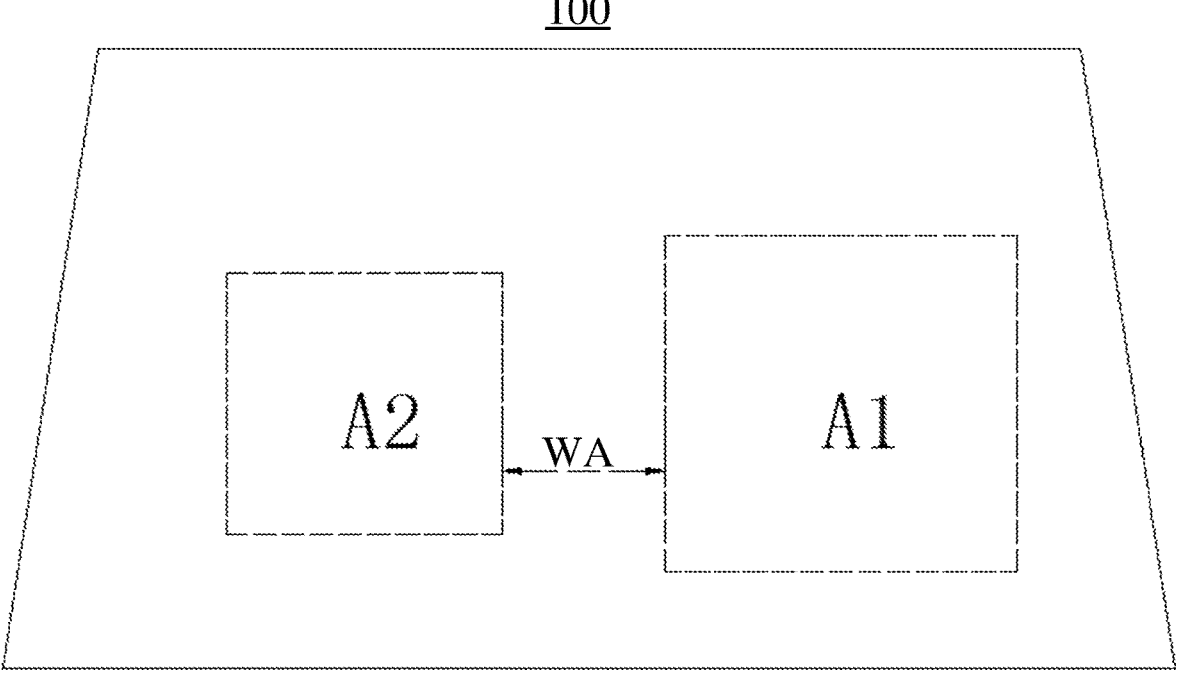
FIG. 3 is a schematic structural top view of window glass provided in embodiments of the present disclosure.

Referring to FIG. 3, in an embodiment, in a horizontal direction, the minimum distance WA between the first projection region A1 and the second projection region A2 ranges from 100 mm to 400 mm. Due to the above distance between the first projection region A1 and the second projection region A2, it can be ensured that the first projection image P1 and the second projection image P2 do not interfere with each other, and the first projection image P1 and the second projection image P2 can be completely displayed on the window glass 100.

In an embodiment, the first angle of incidence θ1 is unequal to the second angle of incidence θ2. The first reflectivity is greater than the second reflectivity.

In the present disclosure, by setting the first angle of incidence θ1 to be unequal to the second angle of incidence θ2, the first projection light S1 and the second projection light S2 can be staggered. Therefore, the first projection image P1 and the second projection image P2 can be staggered from each other, and the first projection image P1 and the second projection image P2 do not interfere with each other. In addition, in the present disclosure, the first reflectivity is greater than the second reflectivity, so that the brightness of the first projection image P1 is greater than the brightness of the second projection image P2. In other words, the brightness of the entertainment image information may be greater than the brightness of the driving information of the vehicle 1000.

In an embodiment, the second angle of incidence θ2 ranges from 53° to 67°. A projection distance of the second projection image P2 ranges from 2 m to 100 m. Due to the above projection distance of the second projection image P2, a viewer can clearly see the second projection image P2. A specific value of the second angle of incidence θ2 is related to a specific position of the second projection image P2.

Figure 4:
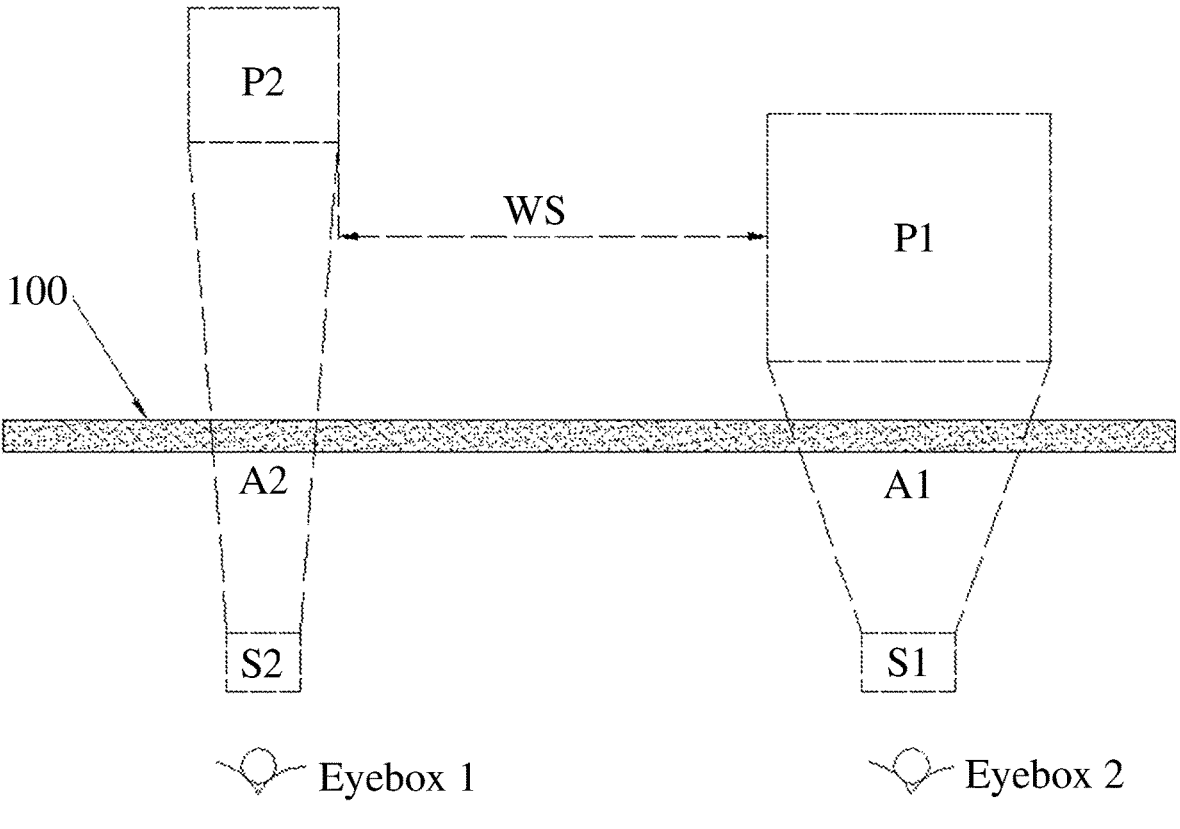
FIG. 4 is a schematic cross-sectional structural view of the window glass in FIG. 3.

Referring to FIG. 1, FIG. 2, and FIG. 4, specifically, the first projection light S1 is incident on the first projection region A1 at the first angle of incidence θ1 to form the first projection image P1 with a distance L1. The second projection light S2 is incident on the second projection region A2 at the second angle of incidence θ2 to form the second projection image P2 with a distance L2. An intermediate film has a wedge angle α ranging from 0.2 mrad to 0.8 mrad. The projection distance L1 ranges from 0.5 m to 3 m. The projection distance L2 ranges from 2 m to 100 m. θ2<θ1. A projection region of the first projection light S1 on a glass surface is the first projection region A1. A projection region of the second projection light S2 on the glass surface is the second projection region A2. To avoid the mutual interference between projection images, in the horizontal direction, a minimum distance WA between the first projection region A1 and the second projection region A2 ranges from 100 mm to 400 mm. In the horizontal direction, a minimum spacing WS between the first projection image P1 and the second projection image P2 ranges from 50 mm to 600 mm.

Figure 5:
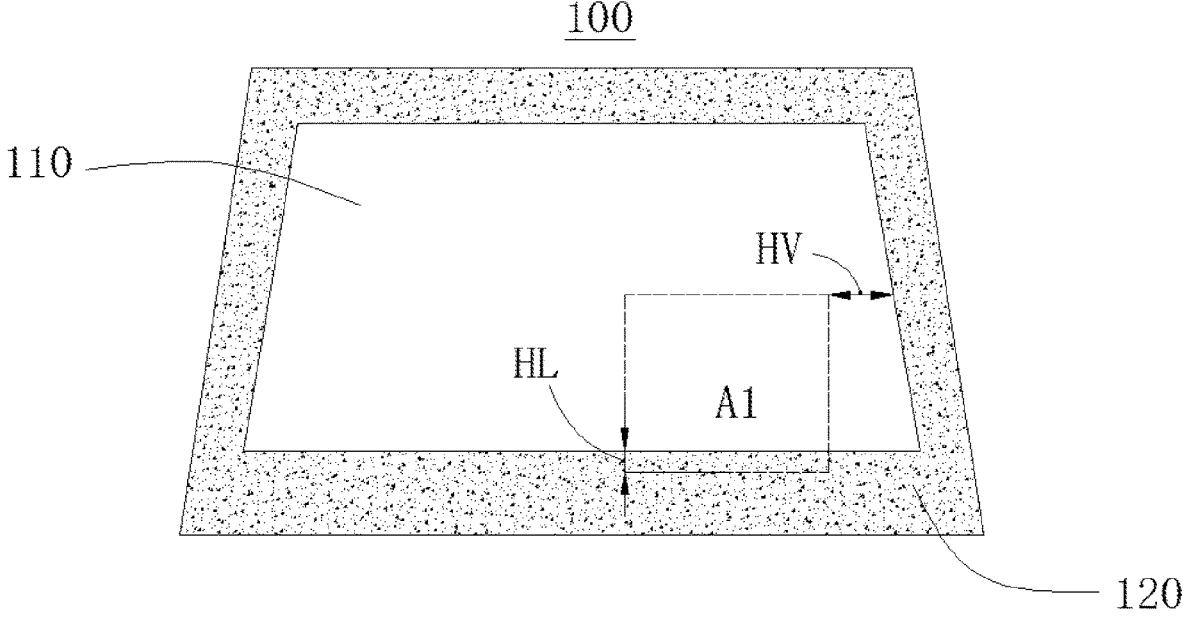
FIG. 5 is a schematic structural top view of another window glass.

Referring to FIG. 5, it can be understood that the window glass 100 includes a transparent region 110 and a functional region 120. The transparent region 110 is located at one side of the functional region 120. At least part of the first projection region A1 overlaps the functional region 120, or the first projection region A1 is spaced apart from the functional region 120. Optionally, when the at least part of the first projection region A1 overlaps the functional region 120, the size of an overlapping part of the first projection region A1 and the functional region 120 ranges from 0 mm to 30 mm. When the first projection region A1 is spaced apart from the functional region 120, a spacing distance between the first projection region A1 and the functional region 120 ranges from 0 mm to 200 mm. The transparent region 110 has a visible light transmittance ranging from 10% to 95%. The functional region 120 has a visible light transmittance less than 10%, preferably less than or equal to 5%, and more preferably less than or equal to 1%. In FIG. 5, the functional region 120 surrounds the transparent region 110. A closest distance HL between a lower boundary of the first projection region A1 and the functional region 120 ranges from −30 mm to 200 mm (−30 mm to 0 mm meaning that the lower boundary of the first projection region A1 overlaps a dark masking layer). The dark masking layer is arranged in the functional region 120. A closest distance HV between a boundary of the first projection region A1 close to an edge of the laminated glass and the dark masking layer is greater than 25 mm. The lower boundary of the A2 region has a horizontal length greater than 200 mm, and an area greater than 0.15 m².

Referring to FIG. 1 and FIG. 2, in an embodiment, the window glass 100 includes a glass layer 10 and an enhanced reflection coating 20. The enhanced reflection coating 20 is disposed on the glass layer 10. The enhanced reflection coating 20 at least covers the first projection region A1. It can be understood that the enhanced reflection coating 20 has a high reflection effect on the first projection light S1 (S-polarized light) projected onto the first projection region A1, so that the reflectivity for the polarized light at the first angle of incidence θ1 of 53° to 67° is improved to at least 25%, or even at least 40%. The enhanced reflection coating 20 has a reflectivity Rs of not less than 25% for S-polarized light at the first angle of incidence θ1 of 53° to 67°, but has a reflectivity RL less than or equal to 16% for visible light.

In the present disclosure, the enhanced reflection coating 20 is disposed on the glass layer 10, the reflectivity for the first projection light S1 is increased, the brightness of the first projection image P1 is increased, the quality of the first projection image P1 is improved, and the luminous intensity of the projection device 130 does not need to be increased.

In an embodiment, the second projection region A2 is not covered by the enhanced reflection coating 20. It can be understood that a position of the glass layer 10 corresponding to the driver's viewing region 112 is not covered by the enhanced reflection coating 20. In this way, the thickness of the window glass 100 and the design difficulty of the window glass 100 can be reduced.

In an embodiment, the second projection region A2 is covered by the enhanced reflection coating 20. The first angle of incidence θ1 is greater than the second angle of incidence θ2. A reflectivity of the enhanced reflection coating 20 for the first projection light S1 projected at the first angle of incidence θ1 is greater than a reflectivity of the enhanced reflection coating 20 for the second projection light S2 projected at the second angle of incidence θ2. It can be understood that the first projection region A1 and the second projection region A2 are both covered by the enhanced reflection coating 20. The enhanced reflection coating 20 also has a high reflection effect on the second projection light S2 (S-polarized light) projected onto the second projection region A2. The enhanced reflection coating 20 has a reflectivity Rs of not less than 25% for the S-polarized light at angle of incidence of 53° to 67°, but has a reflectivity RL less than or equal to 16% for the visible light.

In the present disclosure, the enhanced reflection coating 20 is disposed on the glass layer 10, the reflectivity for the first projection light S1 and the reflectivity for the second projection light S2 are increased, the brightness of the first projection image P1 and the brightness of the second projection image P2 are increased, the quality of the first projection image P1 and the quality of the second projection image P2 are improved, and the luminous intensity of the projection device 130 does not need to be increased.

It can be understood that the reflectivity of the enhanced reflection coating 20 for the S-polarized light increases as the angle of incidence increases. In the present disclosure, the first angle of incidence θ1 is greater than the second angle of incidence θ2, and the reflectivity of the enhanced reflection coating 20 for the first projection light S1 projected at the first angle of incidence θ1 is greater than the reflectivity of the enhanced reflection coating 20 for the second projection light S2 projected at the second angle of incidence θ2. Therefore, the brightness of the first projection image P1 formed by reflection of the first projection light S1 is greater than the brightness of the second projection image P2 formed by reflection of the second projection light S2, so that the first projection image P1 is displayed more clearly. In other words, the first projection image P1 showing the entertainment image information can be displayed more clearly.

In an embodiment, the second projection region A2 is covered by the enhanced reflection coating 20. The first angle of incidence θ1 is equal to the second angle of incidence θ2. A proportion of S-polarized light in the first projection light S1 is greater than a proportion of S-polarized light in the second projection light S2. A reflectivity of the enhanced reflection coating 20 for the first projection light S1 projected at the first angle of incidence θ1 is greater than a reflectivity of the enhanced reflection coating 20 for the second projection light S2 projected at the second angle of incidence θ2.

It can be understood that the reflectivity of the enhanced reflection coating 20 for the S-polarized light increases as the proportion of the S-polarized light increases. In the present disclosure, the first angle of incidence θ1 is equal to the second angle of incidence θ2, and the proportion of the S-polarized light in the first projection light S1 is greater than the proportion of the S-polarized light in the second projection light S2. Therefore, the brightness of the first projection image P1 formed by reflection of the first projection light S1 is greater than the brightness of the second projection image P2 formed by reflection of the second projection light S2, so that the first projection image P1 is displayed more clearly. In other words, the first projection image P1 showing the entertainment image information can be displayed more clearly.

In an embodiment, the glass layer 10 is a single sheet of tempered glass. The single sheet of tempered glass has an outer surface facing the outside of the vehicle 1000 and an inner surface facing the inside of the vehicle 1000. The enhanced reflection coating 20 is disposed on the inner surface. In this embodiment, the glass layer 10 has a first surface 210 and a second surface 220 opposite to each other. The first surface 210 faces towards the outside of the vehicle 1000 and is the outer surface. The second surface 220 faces towards the inside of the vehicle 1000 and is the inner surface. The enhanced reflection coating 20 is disposed on the second surface 220. When the window glass 100 is mounted on the vehicle, the single sheet of tempered glass is usually curved physically tempered glass. The single sheet of tempered glass may also be curved chemically tempered glass, or even be curved injection-molded polycarbonate (PC) glass. The single sheet of tempered glass has the thickness ranging from 2.0 mm to 6.0 mm, and the visible light transmittance ranging from 10% to 95%. In the present disclosure, the thickness of the glass layer 10 is not limited to the above thickness, and may be other thicknesses.

Referring to FIG. 1 and FIG. 2, in an embodiment, the glass layer 10 is laminated glass. The glass layer 10 includes a first glass sub-layer 101, a polymer sub-layer 102, and a second glass sub-layer 103. The first glass sub-layer 101, the polymer sub-layer 102, and the second glass sub-layer 103 are disposed in sequence to form the laminated glass. The first glass sub-layer 101 has a first surface 210 and a second surface 220 opposite to each other. The second glass sub-layer 103 has a third surface 230 and a fourth surface 240 opposite to each other. The polymer sub-layer 102 is disposed close to the second surface 220 and the third surface 230. The enhanced reflection coating 20 is disposed on the second surface 220, at least one surface of the polymer sub-layer 102, the third surface 230, or the fourth surface 240. It can be understood that the visible light transmittance of the laminated glass ranges from 10% to 95%.

It can be understood that the polymer sub-layer 102 is a wedge-shaped intermediate film. The wedge-shaped intermediate film is configured to correct ghosting between a reflection image of the enhanced reflection coating 20 and a reflection image of the first surface 210, the second surface 220, the third surface 230, or the fourth surface 240. A wedge angle α ranges from 0.2 mrad to 0.8 mrad.

It can be understood that the thickness of the first glass sub-layer 101 may range from 0.7 mm to 4.0 mm, such as 3.0 mm, 2.1 mm, 1.8 mm, 1.6 mm, etc. The thickness of the second glass sub-layer 103 may range from 0.7 mm to 4.0 mm, such as 2.1 mm, 1.8 mm, 1.6 mm, 1.1 mm, 0.7 mm, etc. Preferably, the thickness of the second glass sub-layer 103 is less than the thickness of the first glass sub-layer 101, so that the strength requirement of the window glass 100 can be met, and the lightweight requirement of thinning the laminated glass can also be realized. Optionally, the thickness of the polymer sub-layer 102 ranges from 0.38 mm to 1.5 mm.

The first glass sub-layer 101 and the second glass sub-layer 103 each are made of one or two of physically tempered glass, chemically tempered glass, and injection-molded PC glass. For example, the first glass sub-layer 101 and the second glass sub-layer 103 each are the physically tempered glass, the chemically tempered glass, or the injection-molded PC glass. Optionally, one of the first glass sub-layer 101 and the second glass sub-layer 103 is the physically tempered glass, and the other of the first glass sub-layer 101 and the second glass sub-layer 103 is the chemically tempered glass. Optionally, one of the first glass sub-layer 101 and the second glass sub-layer 103 is the physically tempered glass, and the other of the first glass sub-layer 101 and the second glass sub-layer 103 is the injection-molded PC glass. Optionally, one of the first glass sub-layer 101 and the second glass sub-layer 103 is the chemically tempered glass, and the other of the first glass sub-layer 101 and the second glass sub-layer 103 is the injection-molded PC glass. When the window glass 100 is mounted on the vehicle, the first surface 210 faces towards the outside of the vehicle 1000, and the fourth surface 240 faces towards the inside of the vehicle 1000. The first glass sub-layer 101 or the second glass sub-layer 103 may be made of transparent glass, or tinted glass, such as green glass, grey glass, etc.

The polymer sub-layer 102 is configured to bond the first glass sub-layer 101 and the second glass sub-layer 103 together to form the laminated glass. The polymer sub-layer 102 may be made of polyvinyl chloride (PVC), polyvinyl butyral (PVB), ethylene vinyl acetate (EVA), an ionic polymer film (e.g., SentryGlas® Plus (SGP)), etc. The polymer sub-layer 102 may also have other functions. For example, an infrared absorbent is added to the polymer sub-layer 102, so that the polymer sub-layer 102 has a sun protection function or a heat insulation function. For another example, an ultraviolet (UV) absorbent is added to the polymer sub-layer 102, so that the polymer sub-layer 102 has an UV insulation function. For yet another example, more plasticizers are added to the polymer sub-layer 102, so that the polymer sub-layer 102 has a sound insulation function. The polymer sub-layer 102 may be transparent, such as a transparent PVB, or may be tinted, such as a grey PVB, etc.

Optionally, the enhanced reflection coating 20 is disposed on the second surface 220. In this way, the enhanced reflection coating 20 is sandwiched between the first glass sub-layer 101 and the polymer sub-layer 102, and is not in direct contact with the environment. Therefore, the freedom of product mix of the laminated glass is improved, and different requirements of more vehicle models are met.

Optionally, the enhanced reflection coating 20 may also be disposed on at least one surface of the polymer sub-layer 102. For example, the enhanced reflection coating 20 may be disposed on a surface of the polymer sub-layer 102 facing the first glass sub-layer 101, or be disposed on a surface of the polymer sub-layer 102 facing the second glass sub-layer 103.

Optionally, the enhanced reflection coating 20 may be disposed on the third surface 230. In this way, the enhanced reflection coating 20 is sandwiched between the second glass sub-layer 103 and the polymer sub-layer 102, and is not in direct contact with the environment. Therefore, the freedom of product mix of the laminated glass is improved, and different requirements of more vehicle models are met.

Optionally, the enhanced reflection coating 20 is disposed on the fourth surface 240, as illustrated in FIG. 1 and FIG. 2. In this way, the projection light will arrive at the enhanced reflection coating 20 first, so that the reflectivity of the window glass 100 for the projection light can be improved to the maximum extent.

In an embodiment, the enhanced reflection coating 20 has a single-layer structure or a multi-layer structure. Due to one or more layers of the enhanced reflection coating 20, the thickness of the enhanced reflection coating 20 can be adjusted, and the reflection effect of the enhanced reflection coating 20 on the projection light can be adjusted. One or more layers of the enhanced reflection coating 20 are made of the same material or different materials.

In an embodiment, the enhanced reflection coating 20 includes at least one high refractive-index layer and at least one low refractive-index layer. The at least one high refractive-index layer and at least one low refractive-index layer are stacked in sequence, such as one stacked structure (a high refractive-index layer/a low refractive-index layer), two stacked structures (the high refractive-index layer/the low refractive-index layer/the high refractive-index layer/the low refractive-index layer), and three stacked structures (the high refractive-index layer/the low refractive-index layer/the high refractive-index layer/the low refractive-index layer/the high refractive-index layer/the low refractive-index layer). The high refractive-index layer has a refractive index greater than or equal to 1.8. The low refractive-index layer has a refractive index less than or equal to 1.6. It can be understood that the high refractive-index layer may include multiple stacked high refractive-index sub-layers, such as a first high refractive-index sub-layer/a second high refractive-index sub-layer/the low refractive-index layer. The low refractive-index layer may include multiple stacked low refractive-index sub-layers, such as the high refractive-index layer/a first low refractive-index sub-layer/a second low refractive-index sub-layer. The high refractive-index layer is made of at least one of oxides of zinc (Zn), tin (Sn), titanium (Ti), niobium (Nb), zirconium (Zr), nickel (Ni), indium (In), aluminum (Al), cerium (Ce), tungsten (W), molybdenum (Mo), antimony (Sb), bismuth (Bi), or mixtures thereof, or nitrides or nitrogen oxides of silicon (Si), Al, Zr, yttrium (Y), Ce, or lanthanum (La) or mixtures thereof. The low refractive-index layer is made of at least one of $SiO_2$, $Al_2O_3$, or mixtures thereof. Optionally, the refractive index of the high refractive-index layer may be greater than or equal to 2.3. Alternatively, the refractive index of the high refractive-index layer that is furthest away from the glass layer 10 may be greater than or equal to 2.3, and the enhanced reflection coating 20 in this manner is disposed on the fourth surface 240.

In an embodiment, a total thickness of the at least one low refractive-index layer is greater than a total thickness of the at least one high refractive-index layer. In this way, the refractive-index requirements for the projection light can be met.

In an embodiment, a total thickness of the at least one high refractive-index layer ranges from 10 nm to 50 nm. Any one of the at least one low refractive-index layer has a thickness less than or equal to 70 nm. In this way, the reflectivity requirements of the enhanced reflection coating 20 are met, and the enhanced reflection coating 20 can be manufactured efficiently.

In an embodiment, a total thickness of at least one high refractive-index layer ranges from 10 nm to 20 nm. Any one of the at least one high refractive-index layer has a thickness less than or equal to 15 nm. Any one of the at least one low refractive-index layer has a thickness less than or equal to 50 nm. In this way, the reflectivity requirements of the enhanced reflection coating 20 are met, and the enhanced reflection coating 20 can be manufactured efficiently.

In summary, in the present disclosure, the first projection image P1 is displayed in a head up display region at the front-seat passenger side, and the second projection image P2 is displayed at a head up display region at the driver side. Therefore, the head up display region at the driver side and the head up display region at the front-seat passenger side of the window glass 100 are fully utilized. In addition, when the enhanced reflection coating 20 is disposed on the window glass 100, the projection image with high image brightness and high image sharpness can be obtained without increasing luminous power of a projector or disposing the projector of a larger volume. The first projection image P1 displays the entertainment information. The entertainment information includes videos, games, and other types. The second projection image P2 displays driving information. The driving information includes instrument information, navigation information, and some ADAS information.

In the present disclosure, clear driving information can be displayed in the head up display region at the driver side, and clear entertainment information can be displayed in the head up display region at the front-seat passenger side. Therefore, the window glass 100 is fully utilized, a driver is avoided from lowering his/her head while driving, and a person at the front-seat passenger side is avoided from lowering his/her head while watching the entertainment information.

The comparison between the reflectivity of the window glass 100 for the S-polarized light and the reflectivity of the window glass 100 for the visible light (380 nm to 780 nm) will be introduced below, where the window glass 100 in the present disclosure is provided with the enhanced reflection coating 20 on the laminated glass.

| / | Comparative Example 1 | Example 1 | Example 2 | Example 3 | Example 4 | Example 5 |
|---|---|---|---|---|---|---|
| First Glass Sub-Layer 101 | Solar Green Glass 2.0 mm | Clear Glass 2.0 mm | Clear Glass 2.0 mm | Clear Glass 2.0 mm | Clear Glass 2.0 mm | Clear Glass 2.0 mm |
| Second Glass Sub-Layer 103 | Solar Green Glass 2.0 mm | Solar Green Glass 2.0 mm | Solar Green Glass 2.0 mm | Solar Green Glass 2.0 mm | Solar Green Glass 2.0 mm | Solar Green Glass 2.0 mm |
| Enhanced Reflection Coating 20 | None | $ZnSnO_x$: 16 nm $SiO_2$: 38 nm $TiO_2$: 16 nm | $ZnSnO_x$: 8 nm $TiO_2$: 11.5 nm $SiO_2$: 66 nm | $TiO_2$: 5 nm $SiO_2$: 48 nm $TiO_2$: 18 nm $SiO_2$: 57 nm | $SiO_2$: 47 nm $TiO_2$: 13.5 nm $SiO_2$: 45 nm | $SiO_2$: 47 nm $TiO_2$: 5 nm $SiO_2$: 31 nm $TiO_2$: 11 nm $SiO_2$: 46 nm |
| Reflectivity for Visible Light RL | 7.5% | 14.5% | 14.1% | 14.7% | 15.3% | 15.1% |
| Reflectivity for S-Polarized Light (Angle of Incidence Is 45°) | 15.6% | 26.6% | 26.3% | 27.0% | 26.4% | 26.7% |
| Reflectivity for S-Polarized Light (Angle of Incidence Is 55°) | 22.0% | 35.0% | 34.7% | 35.5% | 34.1% | 34.7% |
| Reflectivity for S-Polarized Light (Angle of Incidence Is 60°) | 27.2% | 40.5% | 40.3% | 41.0% | 39.3% | 40.0% |
| Reflectivity for S-Polarized Light (Angle of Incidence Is 65°) | 33.3% | 47.1% | 47.0% | 48.0% | 45.7% | 46.5% |
| Color (D6510°) | $L^* = 33$, $a^* = -2.8$, $b^* = -0.2$ | $L^* = 45$, $a^* = -1$, $b^* = -2.9$ | $L^* = 45$, $a^* = -2$, $b^* = 0.5$ | $L^* = 45$, $a^* = -1$, $b^* = -2$ | $L^* = 46.7$, $a^* = -1.9$, $b^* = -9.1$ | $L^* = 45.8$, $a^* = -3.1$, $b^* = -2.5$ |

According to examples 1, 2, and 4, the enhanced reflection coating 20 includes one stacked structure. According to examples 3 and 5, the enhanced reflection coating 20 includes two stacked structures. The high refractive-index layer may also be disposed at the side of the stacked structure (the high refractive-index layer/the low refractive-index layer) furthest away from the glass layer 10, such as in Example 1. The low refractive-index layer may also be disposed at the side of the stacked structure (the high refractive-index layer/the low refractive-index layer) closest to the glass layer 10, such as in Example 4 and Example 5. The high refractive-index layer of the stack structure (the high refractive-index layer/the low refractive-index layer) may also include multiple high refractive-index sub-layers, such as in Example 2.

It can be seen from the above that in the present disclosure, the window glass 100 provided with the enhanced reflection coating 20 can significantly improve the reflectivity of the window glass 100 for the S-polarized light, thereby improving the sharpness of the projection image and the brightness of the projection image.

It can be understood that color recognition by human eyes is determined by using lightness and chroma in a CIELAB color space. According to the International Commission on Illumination (CIE) 1976, L* represents the lightness and ranges from 0 to 100; and a* (green and red) and b* (blue and yellow) represent the chroma, where a* ranges from −128 to 127, and b* ranges from −128 to 127.

The above disclosures are merely exemplary embodiments of the present disclosure, and certainly are not intended to limit the scope of the claims of the present disclosure. Those of ordinary skill in the art can understand all or a part of the processes of the above embodiments, and equivalent variations made of claims of the present disclosure still belong to the scope of the present disclosure.

What is claimed is:

1. A display window comprising window glass and at least one projection device, wherein the at least one projection device is configured to generate at least one beam of projection light, and correspondingly project the at least one beam of projection light onto at least one projection region of the window glass to correspondingly form at least one projection image, and at least 90% of each of the at least one beam of projection light is S-polarized light; and the at least one beam of projection light comprises first projection light, the at least one projection region comprises a first projection region, the first projection light is projected onto the first projection region at a first angle of incidence to form a first projection image, and the first projection region has a first reflectivity of at least 25% for the first projection light projected at the first angle of incidence.

2. The display window of claim 1, wherein the first angle of incidence ranges from 53° to 67°, and a projection distance of the first projection image ranges from 0.5 m to 3 m.

3. The display window of claim 1, wherein the first projection image has a horizontal field of view (FOV) ranging from 6° to 15°, and a vertical FOV ranging from 2° to 10°.

4. The display window of claim 1, wherein the at least one beam of projection light comprises second projection light, the at least one projection region comprises a second projection region, and the second projection light is projected onto the second projection region at a second angle of incidence to form a second projection image, the second projection region has a second reflectivity of at least 12% for the second projection light projected at the second angle of incidence, and the first projection region is spaced apart from the second projection region.

5. The display window of claim 4, wherein in a horizontal direction, a minimum distance between the first projection region and the second projection region ranges from 100 mm to 400 mm.

6. The display window of claim 4, wherein the first angle of incidence is unequal to the second angle of incidence, and the first reflectivity is greater than the second reflectivity.

7. The display window of claim 4, wherein the second angle of incidence ranges from 53° to 67°, and a projection distance of the second projection image ranges from 2 m to 100 m.

8. The display window of claim 4, wherein the window glass comprises a glass layer and an enhanced reflection coating, the enhanced reflection coating is disposed on the glass layer, and the enhanced reflection coating at least covers the first projection region.

9. The display window of claim 8, wherein the glass layer is a single sheet of tempered glass, the single sheet of tempered glass has an outer surface facing an outside of a vehicle and an inner surface facing an inside of the vehicle, and the enhanced reflection coating is disposed on the inner surface.

10. The display window of claim 8, wherein the glass layer is laminated glass, the glass layer comprises a first glass sub-layer, a polymer sub-layer, and a second glass sub-layer, and the first glass sub-layer, the polymer sub-layer, and the second glass sub-layer are disposed in sequence to form the laminated glass; the first glass sub-layer has a first surface and a second surface opposite to each other, the second glass sub-layer has a third surface and a fourth surface opposite to each other, and the polymer sub-layer is disposed close to the second surface and the third surface; and the enhanced reflection coating is disposed on the second surface, at least one surface of the polymer sub-layer, the third surface, or the fourth surface.

11. The display window of claim 8, wherein the second projection region is not covered by the enhanced reflection coating.

12. The display window of claim 8, wherein the second projection region is covered by the enhanced reflection coating, the first angle of incidence is greater than the second angle of incidence, and a reflectivity of the enhanced reflection coating for the first projection light projected at the first angle of incidence is greater than a reflectivity of the enhanced reflection coating for the second projection light projected at the second angle of incidence.

13. The display window of claim 8, wherein the second projection region is covered by the enhanced reflection coating, the first angle of incidence is equal to the second angle of incidence, and a proportion of S-polarized light in the first projection light is greater than a proportion of S-polarized light in the second projection light, and a reflectivity of the enhanced reflection coating for the first projection light projected at the first angle of incidence is greater than a reflectivity of the enhanced reflection coating for the second projection light projected at the second angle of incidence.

14. The display window of claim 8, wherein the enhanced reflection coating comprises at least one high refractive-index layer and at least one low refractive-index layer, the at least one high refractive-index layer and the at least one low refractive-index layer are stacked alternately, the at least one high refractive-index layer each has a refractive index greater than or equal to 1.8, and the at least one low refractive-index layer each has a refractive index less than or equal to 1.6.

15. The display window of claim 14, wherein a total thickness of the at least one low refractive-index layer is greater than a total thickness of the at least one high refractive-index layer.

16. The display window of claim 14, wherein a total thickness of the at least one high refractive-index layer ranges from 10 nm to 50 nm; and any one of the at least one low refractive-index layer has a thickness less than or equal to 70 nm.

17. The display window of claim 14, wherein a total thickness of the at least one high refractive-index layer ranges from 10 nm to 20 nm, and any one of the at least one high refractive-index layer has a thickness less than or equal to 15 nm; and any one of the at least one low refractive-index layer has a thickness less than or equal to 50 nm.

18. The display window of claim 14, wherein the window glass comprises a transparent region and a functional region, the transparent region has a visible light transmittance ranging from 10% to 95%, the functional region has a visible light transmittance less than 10%, and a closest distance between a lower boundary of the first projection region and the functional region ranges from −30 mm to 200 mm.

19. A vehicle comprising a vehicle body and a display window, wherein the display window comprises window glass and at least one projection device, wherein the at least one projection device is configured to generate at least one beam of projection light, and correspondingly project the at least one beam of projection light onto at least one projection region of the window glass to correspondingly form at least one projection image, and at least 90% of each of the at least one beam of projection light is S-polarized light;

the at least one beam of projection light comprises first projection light, the at least one projection region comprises a first projection region, the first projection light is projected onto the first projection region at a first angle of incidence to form a first projection image, and the first projection region has a first reflectivity of at least 25% for the first projection light projected at the first angle of incidence; and the window glass is mounted on the vehicle body, and the projection device is disposed in the vehicle body.

20. The vehicle of claim 19, wherein the at least one projection region comprises the first projection region and a second projection region, the first projection region corresponds to a front-seat passenger's viewing region of the vehicle, and the second projection region corresponds to a driver's viewing region of the vehicle.

* * * * *